(12) United States Patent
Nakamura et al.

(10) Patent No.: US 8,708,411 B2
(45) Date of Patent: Apr. 29, 2014

(54) VEHICLE SEAT

(75) Inventors: Kenji Nakamura, Fuchu-cho (JP);
Masafumi Okamoto, Fuchu-cho (JP);
Ryota Okimoto, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 314 days.

(21) Appl. No.: 12/872,635

(22) Filed: Aug. 31, 2010

(65) Prior Publication Data
US 2011/0057492 A1 Mar. 10, 2011

(30) Foreign Application Priority Data

Sep. 4, 2009 (JP) ................................. 2009-204738
Nov. 9, 2009 (JP) ................................. 2009-255789
Jul. 6, 2010 (JP) ................................. 2010-153819

(51) Int. Cl.
*A47C 7/28* (2006.01)
*B60N 2/66* (2006.01)

(52) U.S. Cl.
USPC .................................. 297/284.4; 297/216.13

(58) Field of Classification Search
USPC .......... 297/216.14, 216.13, 284.4, 301.4, 383
See application file for complete search history.

(56) References Cited

U.S. PATENT DOCUMENTS

| | | | | |
|---|---|---|---|---|
| 4,368,917 A | * | 1/1983 | Urai | 297/452.54 |
| 5,022,709 A | * | 6/1991 | Marchino | 297/452.24 |
| 5,087,098 A | * | 2/1992 | Ishizuka | 297/284.4 |
| 5,286,087 A | * | 2/1994 | Elton | 297/284.8 |
| 5,318,341 A | * | 6/1994 | Griswold et al. | 297/362.11 |
| 5,403,069 A | * | 4/1995 | Inara et al. | 297/284.4 |
| 5,518,294 A | | 5/1996 | Ligon, Sr. et al. | |
| 6,769,737 B2 | * | 8/2004 | Choi | 297/216.14 |
| 6,811,227 B2 | * | 11/2004 | Andersson et al. | 297/452.49 |
| 7,731,285 B2 | * | 6/2010 | Koike | 297/284.4 |
| 2003/0085600 A1 | | 5/2003 | Mori | |
| 2006/0103204 A1 | | 5/2006 | Walker et al. | |
| 2012/0217778 A1 | * | 8/2012 | Okamoto et al. | 297/284.8 |

FOREIGN PATENT DOCUMENTS

JP 7-291005 11/1995

* cited by examiner

*Primary Examiner* — David R Dunn
*Assistant Examiner* — Timothy J Brindley
(74) *Attorney, Agent, or Firm* — Gerald E. Hespos; Michael J. Porco; Matthew T. Hespos (57) ABSTRACT

A seat back frame includes: a base frame; a movable frame supported for movement in a frontward-rearward direction with respect to the base frame; and a biasing member biasing the movable frame frontwardly and permitting a rearward movement of the movable frame in response to a load having a given value or more. The base frame has an upper frame section supporting a headrest, and two side frame sections extending in an upward-downward direction on laterally opposite sides of the upper frame section. The movable frame has a back-receiving section located between the side frame sections, and two side support sections on laterally opposite sides of the back-receiving section to project forward from the side frame sections. Front ends of the side support sections are disposed to stop a rear surface of the pad that receives a rearward load from a back of an occupant.

11 Claims, 11 Drawing Sheets

VEHICLE SEAT

BACKGROUND OF THE INVENTION

1. Field of the Invention

The present invention relates to a vehicle seat which comprises a seat back including a pad and a seat back frame supporting the pad, and a headrest provided on a top of the seat back.

2. Description of the Related Art

Figure 12A:
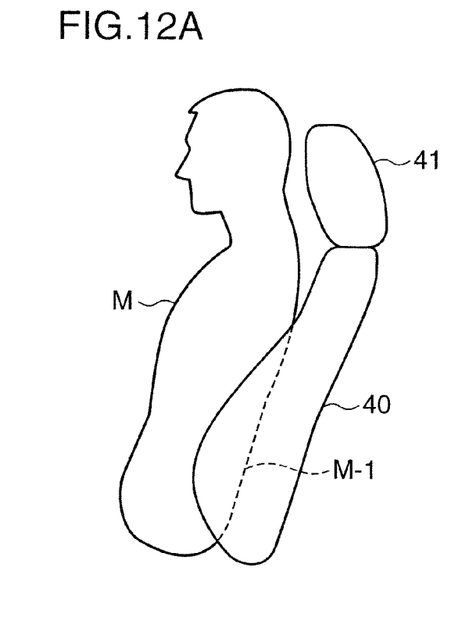
FIGS. 12A, 12B and 12C are a side view showing a state after an occupant is seated in a vehicle seat in a normal state, a side view showing a state after a back of the occupant is sunk into a seat back during a rear collision, and a horizontal cross-sectional view showing a state after a pad of the seat back is deformed during the rear collision, respectively.

In a vehicle, particularly an automobile, with a view to measures against neck damage (whiplash injury) to an occupant (seated person) in the event of a rear collision, a headrest 41 is provided on a top of a seat back 40 of a vehicle seat, as shown in FIG. 12A. However, simply providing the headrest 41 is not enough for the whiplash injury measures.

Therefore, it has been proposed to couple a seat back frame and a cushioning S-spring (spring curved in a sinuous configuration) through a coupling member adapted to be stretched rearwardly only when a load having a given value or more is applied thereto (see JP 7-291005A).

Figure 12B:
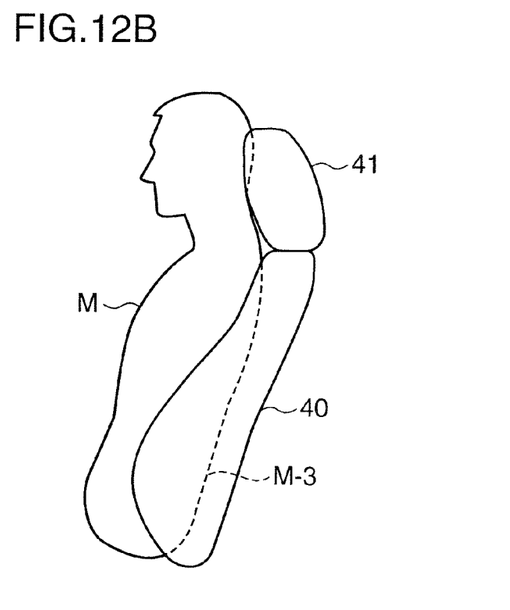

In a vehicle seat disclosed in the above patent document, as shown in FIG. 12B, when a load from an occupant M is applied to the S-spring due to the reaction of a rear collision, the coupling member is stretched rearwardly, so that a back of the occupant M is deeply sunk into the seat back 40 to allow a head of the occupant is stopped by the head rest 41.

Figure 12C:
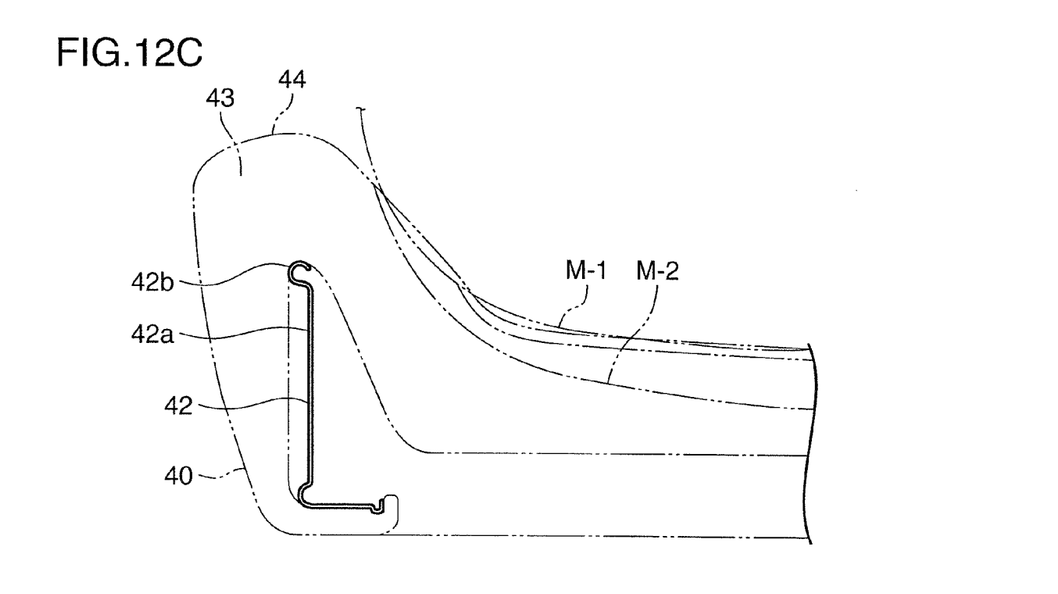

FIG. 12C shows a horizontal cross-section of the seat back 40. As shown in FIG. 12, the seat back 40 comprises a pad 43, and a base frame 42 supporting the pad 43. The base frame 42 has a pair of side frame sections 42a extending along respective ones of opposite lateral portions of the seat back 40. In a normal state, a front end 42b of each of the side frame sections 42a supports a rear surface of the pad 43 which receives a rearward load from the back of the occupant M. In FIG. 12C, the reference numeral 44 indicates a skin (trim) covering an outer surface of the pad 43.

In the event of a rear collision with a vehicle, due to the reaction of the rear collision, a large rearward load from the back of the occupant M is applied to the pad 43. Then, the pad 43 is pressed and flattened, and the back of the occupant M is displaced in such a manner as to be sunk into the seat back 40. In FIG. 12C, a contour of the back of the occupant M in the normal state is indicated by the line M-1, and a contour of the back of the occupant M during the rear collusion is indicated by the line M-2.

As above, during a rear collision with a vehicle, the back of the occupant M is urged to be displaced rearwardly while pressing and flattening the pad 43. However, actually, the rear surface of the pad 43 comes into contact with the front ends 42b of the right and left side frame sections 42a, so that deformation (flexural deformation in the rearward direction) of the pad 43 is hindered by the front ends 42b of the side frame sections 42a, and thereby a distance of the rearward displacement of the occupant M is restricted. Consequently, the line M-2 of the back of the occupant M during the rear collision is likely to become unable to be sufficiently displaced rearwardly, which leads to a risk of failing to adequate stop the head of the occupant by the head rest 41.

SUMMARY OF THE INVENTION

In view of the above problem, it is an object of the present invention to provide a vehicle seat capable of facilitating a deformation of a pad during a rear collision to allow a head of an occupant to be reliably stopped by a headrest.

In order to achieve the above object, the present invention provides a vehicle seat which comprises a seat back including a pad and a seat back frame supporting the pad, and a headrest provided on a top of the seat back. The seat back frame includes: a base frame; a movable frame supported in a movable manner in a frontward-rearward direction with respect to the base frame; and biasing member biasing the movable frame frontwardly and being adapted to permit a rearward movement of the movable frame when a load having a given value or more is input thereinto. The base frame has an upper frame section supporting the headrest, and a pair of side frame sections extending in an upward-downward direction in respective positions on laterally opposite sides of the upper frame section. The movable frame has a back-receiving section located between the pair of side frame sections, and a pair of side support sections provided on respective ones of laterally opposite sides of the back-receiving section to project forward from the side frame sections. Respective front ends of the pair of side support sections are disposed to stop a rear surface of the pad which receives a rearward load from a back of an occupant.

BRIEF DESCRIPTION OF THE DRAWINGS

FIG. 7A and FIG. 7B are horizontal cross-sectional views of a seat back, wherein FIG. 7A shows a state after the movable frame is moved frontwardly, and FIG. 7B shows a state after the movable frame is moved rearwardly during a rear collision.

FIGS. 9A and 9B are side views for explaining a movement of the movable frame, in a modified embodiment where a function of adjusting a frontward-rearward position of the movable frame is omitted, wherein FIG. 9A shows a state after the movable frame is moved frontwardly, and FIG. 9B shows a state after the movable frame is moved rearwardly.

DESCRIPTION OF THE PREFERRED EMBODIMENTS

Figure 1:
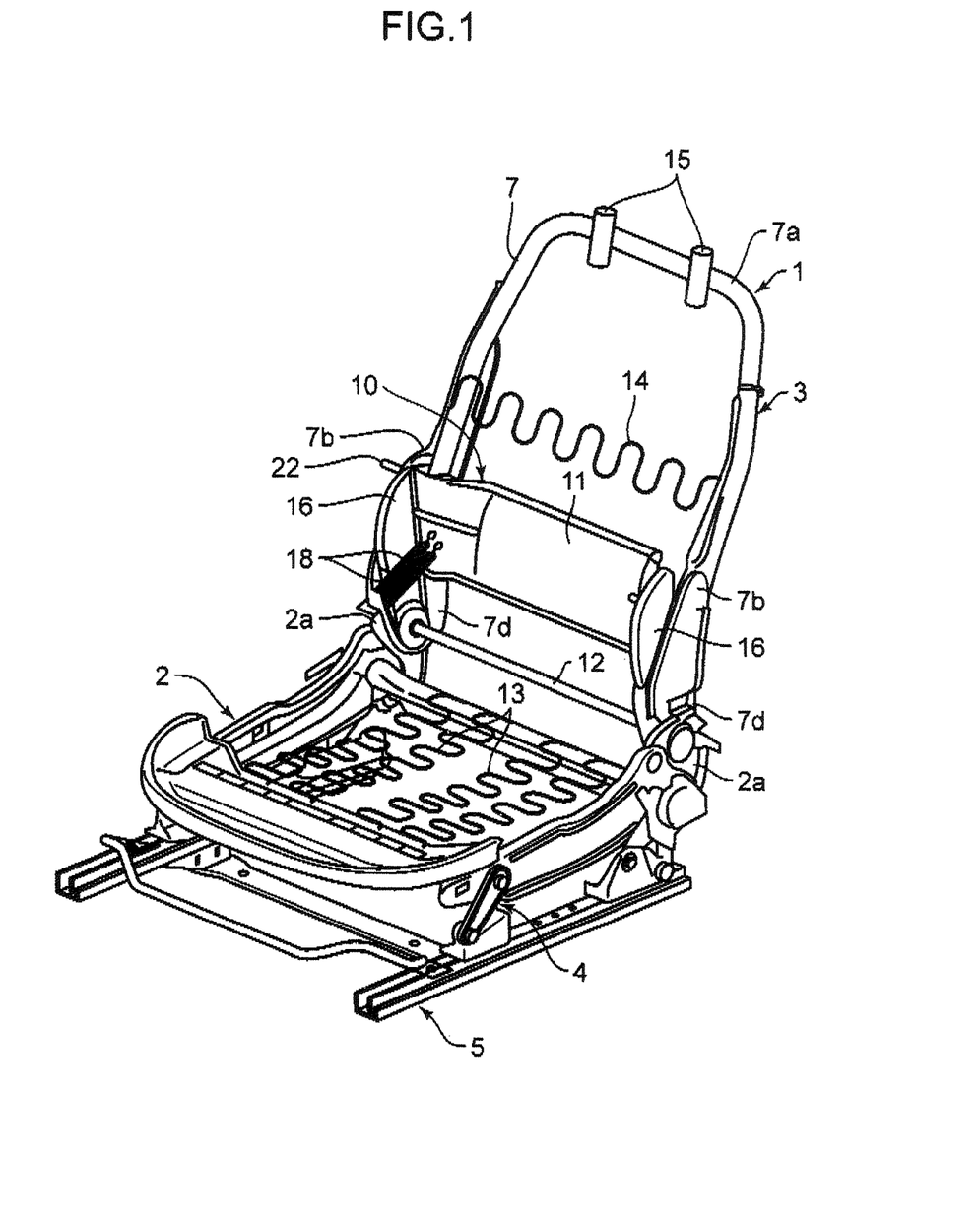
FIG. 1 is a perspective view showing an internal skeleton structure of a vehicle seat according to one embodiment of the present invention.

With reference to the drawings, the present invention will now be specifically described based on one embodiment thereof. FIG. 1 is a perspective view showing an internal skeleton structure of a seat 1 for a vehicle (vehicle seat). The seat 1 comprises a cushion frame 2 as a skeleton member for a seat cushion, and a seat beck frame 3 as a skeleton member for a seat back.

The cushion frame 2 has a lower portion mounted to a lifter 4 for moving the seat cushion in an upward-downward direction, and a slider 5 for moving the seat cushion in a frontward-rearward direction of the vehicle.

The seat back frame 3 includes a base frame 7 formed in a reverse U shape in front view. The base frame 7 has an upper frame section 7a, and a pair of right and left side frame sections 7b extending downwardly from respective ones of laterally opposite ends of the upper frame section 7a.

A movable frame 10 is supported in a movable manner in the frontwar-rearward direction with respect to the base frame 7, in a position between the pair of right and left side frame sections 7b of the base frame 7. The movable frame 10 is provided at a height position of a lower region of the base frame 7, correspondingly to a height position of a lumbar region of an occupant (see the reference numeral M in FIGS. 12A and 12B)

Each of the pair of right and left side frame sections 7b has an upper bracket 7d provided on a lower portion thereof, and the cushion frame 2 of the seat cushion has a pair of right and left lower brackets 2a provided on a rear portion thereof. Each of the upper brackets 7d is pivotally supported by a corresponding one of the lower brackets 2a through a reclining shaft 12 extending in a widthwise (rightward-leftward) direction of the vehicle, so that the upper brackets 7d is swingably moved about the reclining shaft 12. Thus, the seat back can be tilted (reclined) in the frontward-rearward direction with respect to the seat cushion.

The cushion frame 2 is provided with a plurality of (in the illustrated embodiment, four) S-springs 13 in a tensioned state, and a cushion pad (not shown) is installed on an upper side of the S-springs 13.

The base frame 7 of the seat back frame 3 is provided with an S-spring 14 in a tensioned state. In the illustrated embodiment, a single S-spring 14 is provided on an upper region of the base frame 7, and the movable frame 10 is provided below the S-spring 14.

Figure 7A:
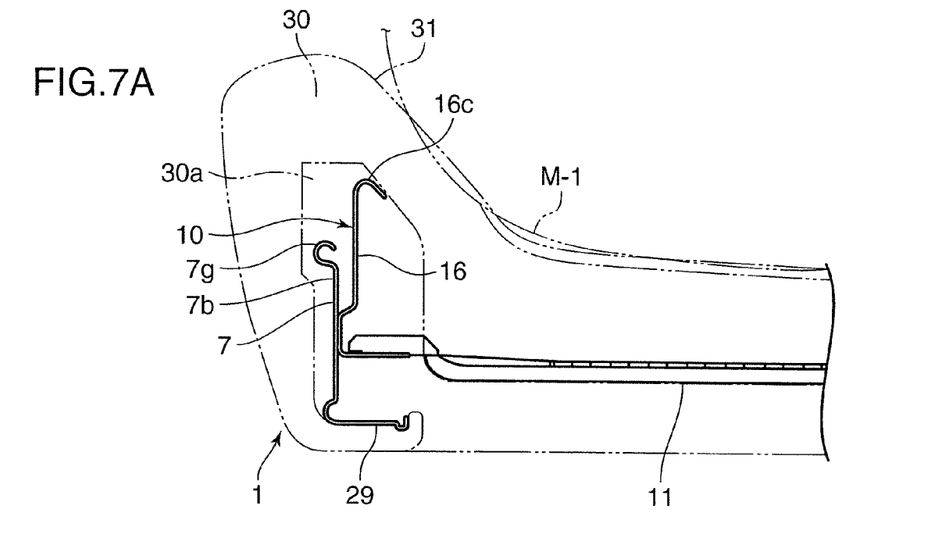
Figure 7B:
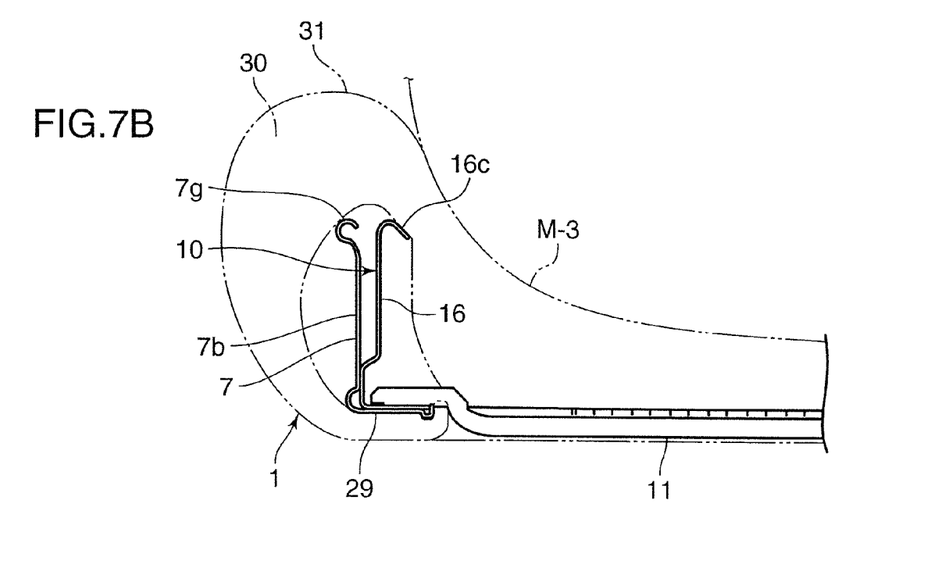

A pad 30 illustrated in FIGS. 7A and 7B is installed on a frontward side of the S-spring 14 and the movable frame 10. The pad 30 is supported by the base frame 7 of the seat back frame 3. An outer surface of the pad 30 is covered by a skin 31 (trim).

A pole guide holder 15 is provided on an upper portion (upper frame section 7a) of the base frame 7. A pole guide for supporting a pole of a headrest (see the reference numeral 41 in FIGS. 12A and 12B) in a slidable manner is attached to the pole guide holder 15.

Figure 2:
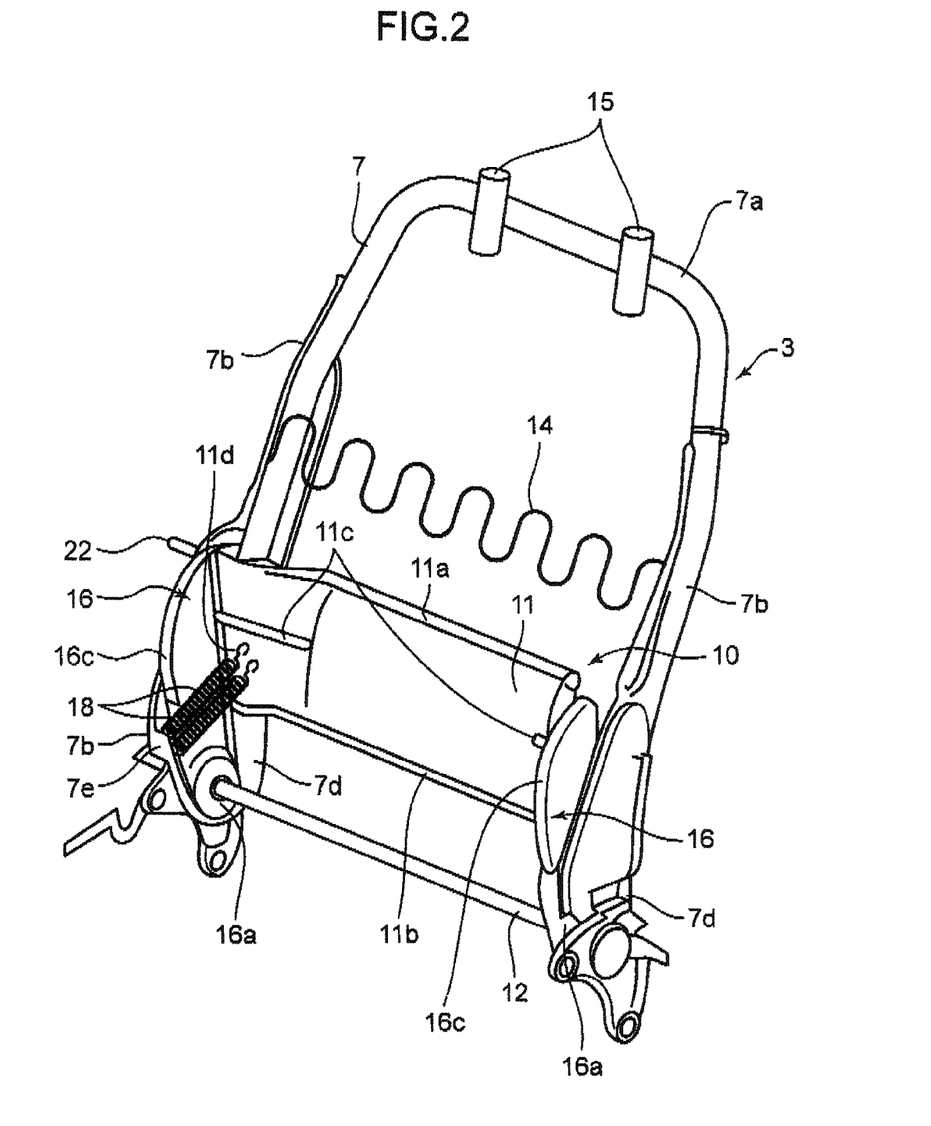
FIG. 2 is a perspective view of a seat back frame.
Figure 3:
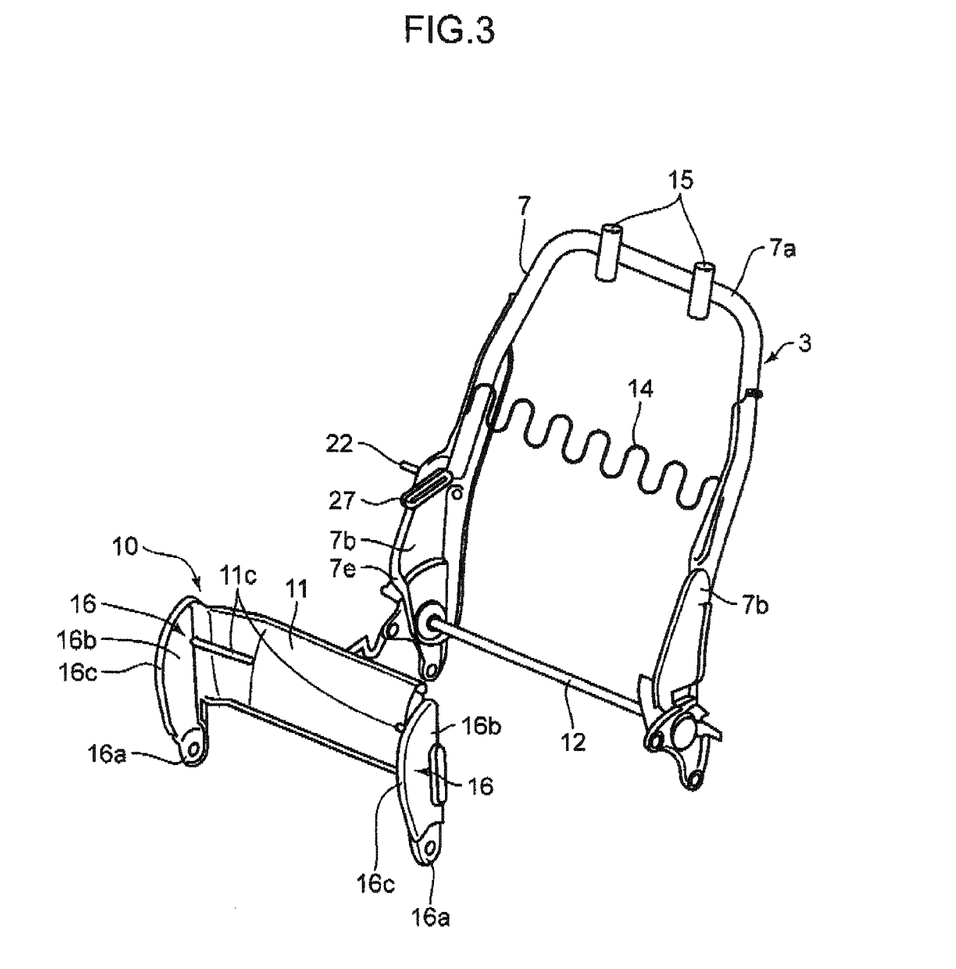
FIG. 3 is an exploded perspective view of a base frame and a movable frame in the seat back frame.
Figure 4A:
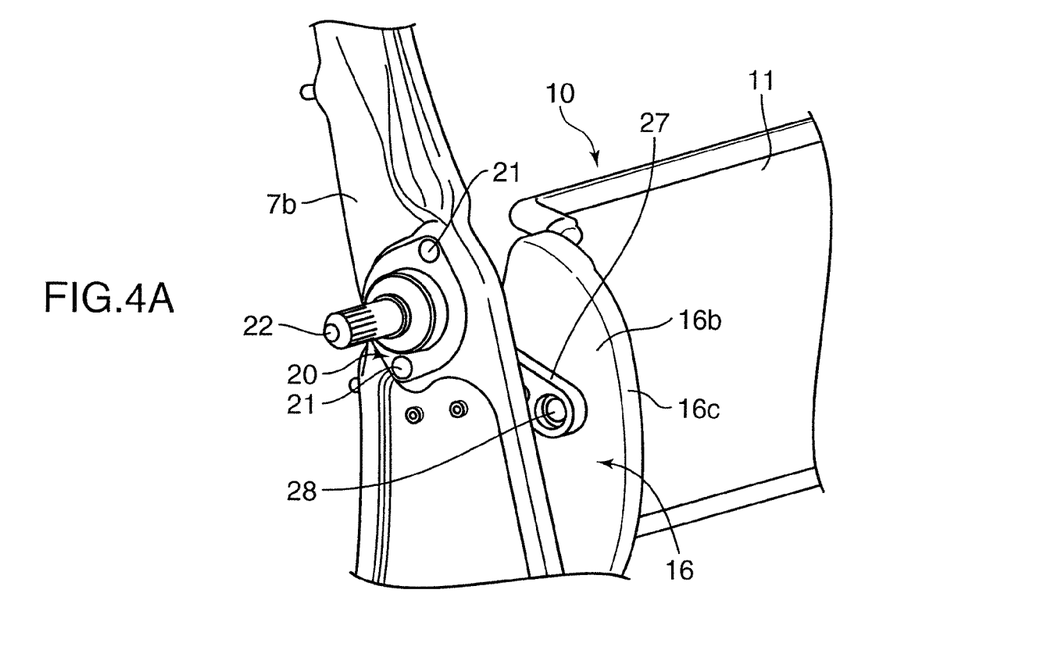
FIG. 4A and FIG. 4B are a perspective view of a brake-drum mounting structure, when viewed from thereoutside, and a perspective view of the mounting structure, when viewed from thereinside, respectively.
Figure 4B:
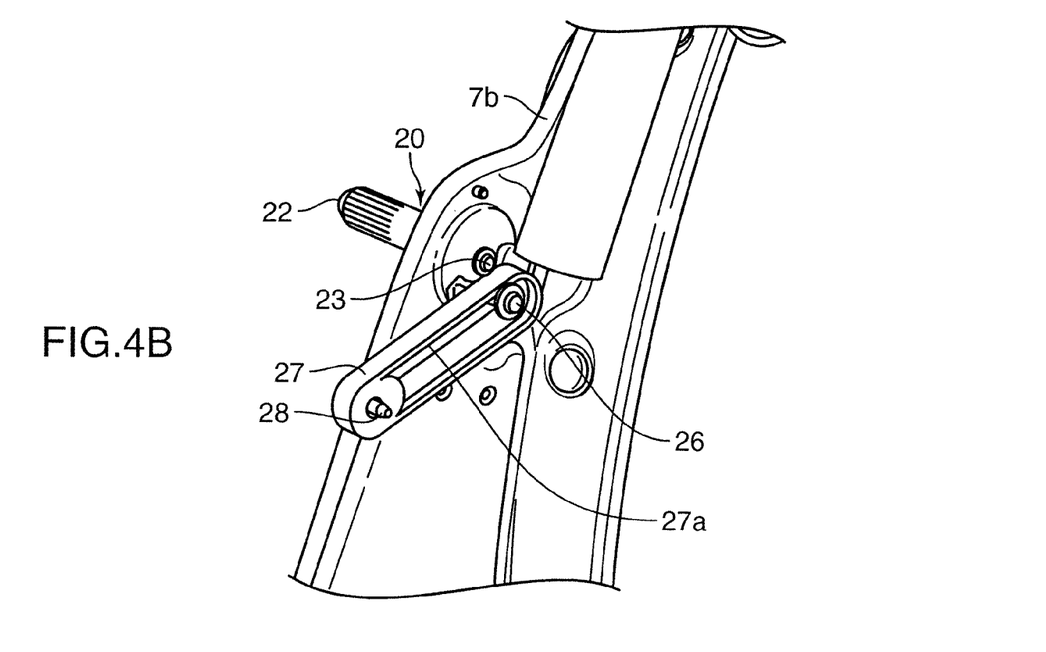
Figure 5:
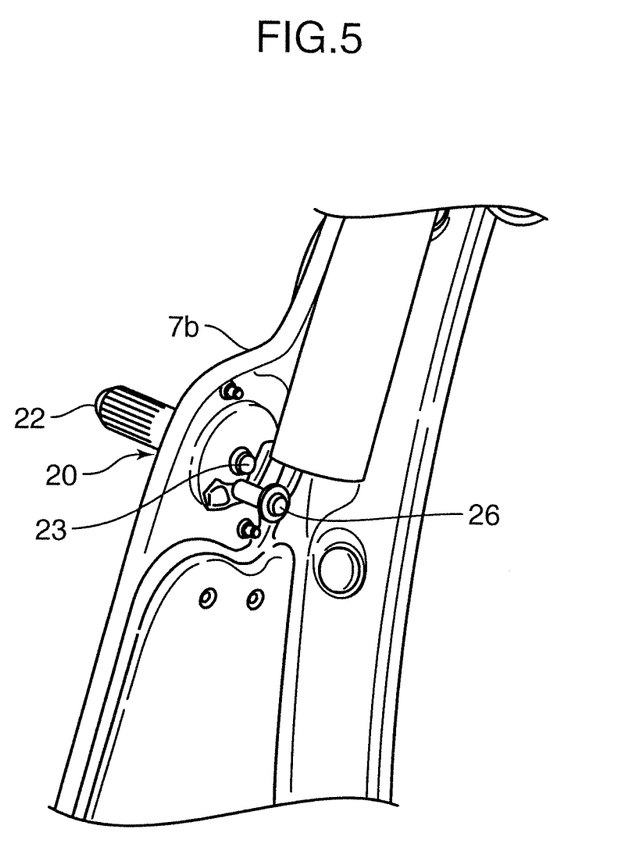
FIG. 5 is a perspective view of the brake-drum mounting structure, in a state after a link is removed therefrom.
Figure 6:
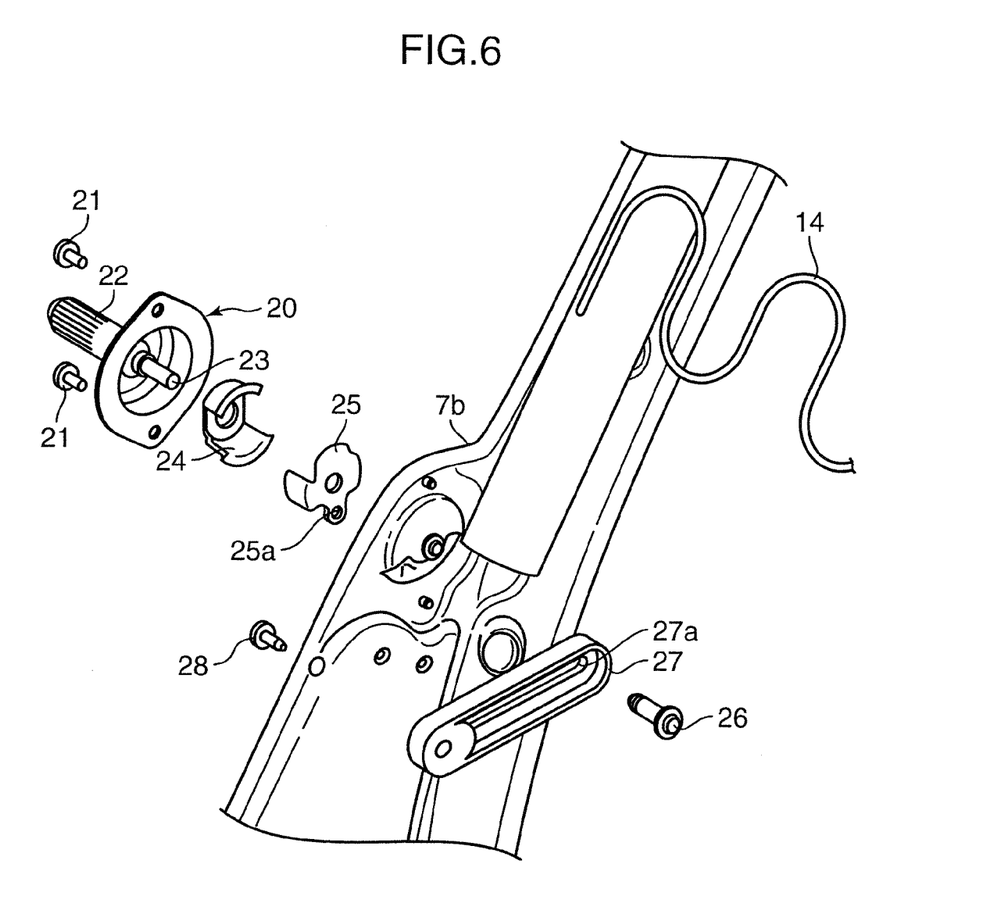
FIG. 6 is an exploded perspective view of the brake-drum mounting structure.

As specifically shown in FIGS. 2 and 3, the movable frame 10 has a back-receiving section 11 formed in a laterally-long rectangular shape in front view, and a pair of side support sections 16 provided on laterally opposite sides of the back-receiving section 11.

Figure 8A:
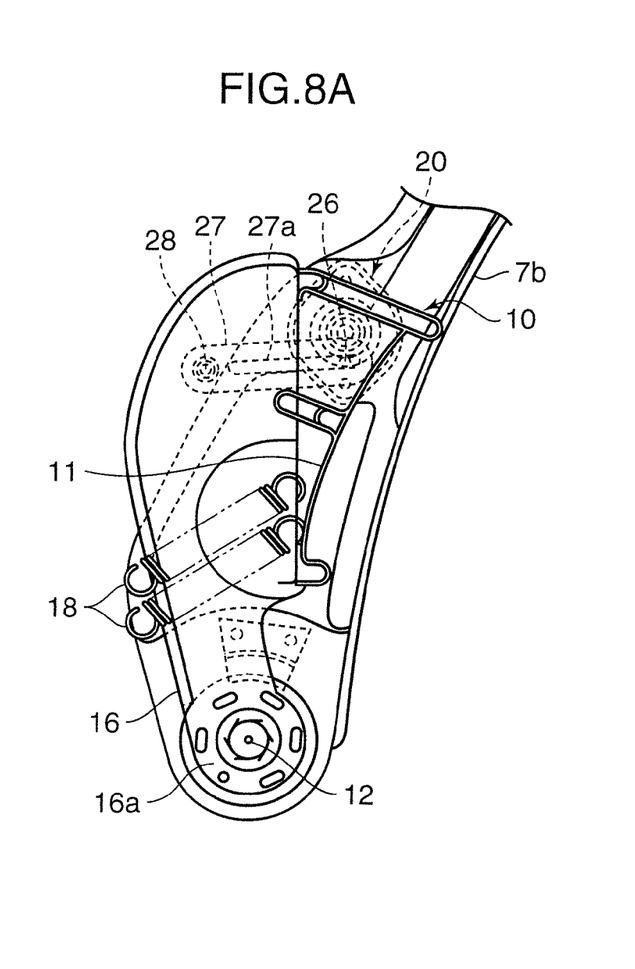
FIG. 8A and FIG. 8B are a side view showing the state after the movable frame is moved frontwardly, and a side view showing the state after the movable frame is moved rearwardly during the rear collision, respectively.
Figure 8B:
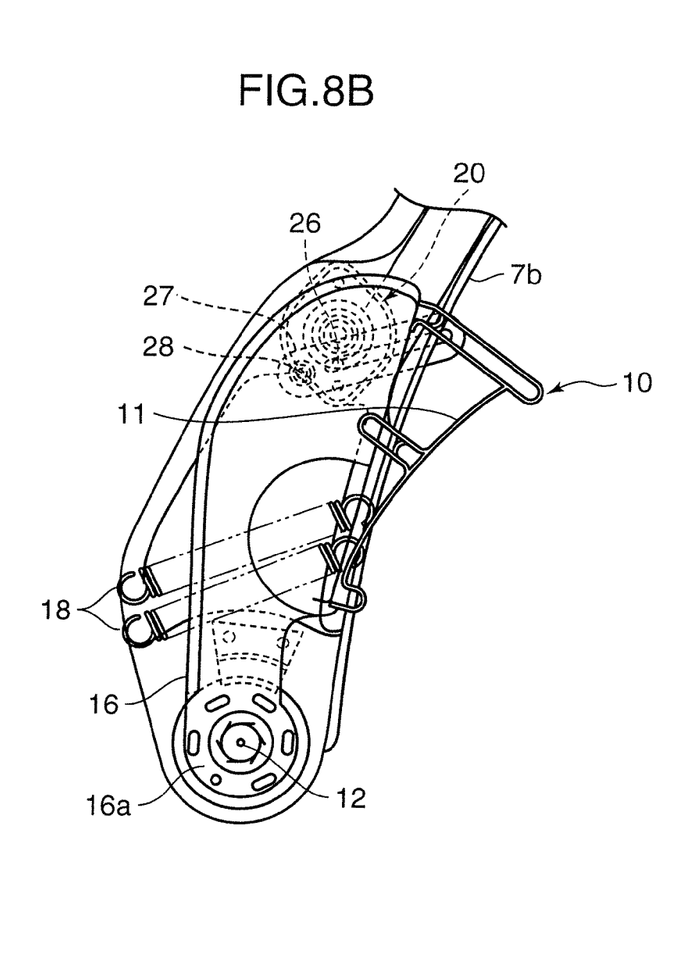

The back-receiving section 11 is formed in a frontwardly-convex arc shape in side view (see, for example, FIGS. 8A and 8B). The back-receiving section 11 has two reinforcing beads 11a, 11b formed on respective ones of upper and lower edges thereof, and a reinforcing bead 11c formed on each portion adjacent to laterally opposite edges thereof.

Each of the right and left side support sections 16 has a bearing portion 16a provided in a lower portion thereof to allow the reclining shaft 12 to be inserted thereinto. Thus, each of the side support sections 16 is supported in a swingable manner about the reclining shaft 12 in the frontward-rearward direction. Further, a portion of each of the side support sections 16 located above the bearing portion 16a thereof has a rear edge joined to a corresponding one of the laterally opposite edges of the back-receiving section 11 by welding or the like.

In a normal state when no vehicle collision occurs, the right and left side support sections 16 are disposed to project forward from the respective side frame sections 7b of the base frame 7. Specifically, as shown in FIG. 7A, a front end 16c of each of the side support sections 16 is located frontward of a front end 7g of a corresponding one of the side frame sections 7b.

The front ends 16c of the side support sections 16 are disposed in contact relation with (or adjacent relation to) a rear surface of the pad 30. Thus, when a rearward load from a back of an occupant seated in the seat 1 is applied to the pad 30, the load is supported by the front ends 16c of the side support sections 16. A region of an inner surface of the pad 30 located around the front end 16c of each of the side support sections 16 is formed as a concave portion 30a concaved toward the outer surface of the pad 30, so that a thickness of the pad 30 around the front end 16c is reduced by a depth of the concave portion 30a.

As shown in FIG. 2, the back-receiving section 11 of the movable frame 10 is biased frontwardly by a tension coil spring (biasing member) 18. Specifically, the back-receiving section 11 has an engagement site 11d provided on each of the portions adjacent to the laterally opposite edges thereof (portions reinforced by the reinforcing bead 11c) to allow one end of the tension coil spring 18 to be engaged therewith, and each of the side frame sections 7b has an engagement site 7e for allowing the other end of the tension coil spring 18 to be engaged therewith. The movable frame 10 is biased to be swingably moved in a frontward direction about the reclining shaft 12, by a biasing force of the tension spring 18 having the ends engaged with the respective engagement sites 11d, 7e.

The biasing force of the tension coil spring 18 is set at a level which permits a rearward movement of the movable frame 10 when a load having a given value or more is applied from the back of the occupant thereto in the event of a rear collision with a vehicle. In the illustrated embodiment, the tension coil spring 18 is provided on each of the right and left sides in the form of a set consisting of two tension coil springs (i.e., a total number of the tension coil springs 18 is four). The total number may be increased and reduced to adjust the biasing force.

As specifically shown in FIGS. 4A, 4B, 5 and 6, a brake drum 20 is mounted to on outer surface of the side frame section 7b located on the right side on the basis of the occupant, through a caulking pin 21. This brake drum 20 has a commonly known structure which comprises an input shaft 22, and an output shaft 23 adapted to be rotated according to a manual rotating operation of the input shaft 22, wherein it is designed such that a torque manually input into the input shaft 22 is transmitted to the output shaft 23, whereas a torque from the output shaft 23 is kept from being transmitted to the input shaft 22. Although not illustrated, a manual operation handle is attached to the input shaft 22.

Two components 24, 25 (FIG. 6) are attached to the output shaft 23 of the brake drum 20. The component 25 is press-fitted on the output shaft 23 so as to become rotatable integrally with the output shaft 23. The component 25 will hereinafter be referred to as "pinion plate". The pinion plate 25 is formed with a hole 25a, and an after-mentioned stopper pin 26 for restricting a frontward movement of the movable frame 10 is fitted into the hole 25a. Among FIGS. 4A, 4B, 5 and 6, the movable frame 10 is illustrated only in FIG. 4A, but it is omitted in FIGS. 4B, 5 and 6.

A link 27 is attached between an inner surface of the side frame section 7b and an outer surface of a corresponding one of the side support sections 16. The link 27 has a front portion pivotally supported by the side support section 16 through a support pin 28, so that the link 27 is swingably moved about the support pin 28. The link 27 is formed with an elongate hole 27a, and a stopper pin 26 is slidably inserted into the elongate hole 27a.

A combination of the link 27, the support pin 28 and the stopper pin 26 makes up a front stopper adapted to restrain the movable frame 10 from being moved a given distance or more frontwardly. Specifically, the movable frame 10 is pulled and moved frontwardly by the biasing force of the tension coil springs 18. However, when the stopper pin 26 comes into contact with a rear end of the elongate hole 27a of the link 27, the movable frame 10 cannot be moved any further. In this manner, the frontward movement of the movable frame 10 is restricted by causing the stopper pin 26 to come into contact with the rear end of the elongate hole 27a.

A frontward-rearward position of the movable frame 10 can be adjusted by the manual operation handle attached to the brake drum 20. Specifically, when the input shaft 22 of the brake drum 20 is rotated by the manual operation handle, the output shaft 23 and the pinion plate 25 are rotated according to the rotation of the input shaft 22, and simultaneously the stopper pin 26 fixed to the pinion plate 25 is moved in an arc. Thus, a frontward-rearward position of the stopper pin 26 is changed, and a frontward-rearward position of the rear end of the link 27 is changed accordingly, so that the link 27 is swingably moved in the frontward-rearward direction. In this manner, the frontward-rearward position of the movable frame 10 is adjusted by moving the link 27 in the frontward-rearward direction. FIG. 8A illustrates a state when the frontward-rearward position of the movable frame 10 is set to an approximately intermediate position of an adjustable range.

In the event of a rear collision with a vehicle, a rearward load from the back of the occupant is applied to the pad 30 due to the reaction of the rear collision, and transmitted to the movable frame 10 via the pad 30, so that the movable frame 10 is moved rearwardly against the biasing force of the tension coil springs 18. In order to restrict the above rearward movement of the movable frame 10, a rear stopper 29 (see FIGS. 7A and 7B) is integrally provided in each of the side frame sections 7b of the base frame 7. Specifically, when the movable frame 10 is moved rearwardly in the event of a rear collision with a vehicle, each of the side support sections 16 of the movable frame 10 comes into contact with a corresponding one of the rear stoppers 29 to prevent the movable frame 10 from being moved a given distance or more rearwardly.

An operation of the vehicle seat 1 according to this embodiment having the seat back frame 3 with the above structure will be described below. In the event of a rear collision with a vehicle, a load from an occupant is applied to the back-receiving section 11 of the movable frame 10 due to the reaction of the rear collision, and thereby the movable frame 10 is moved rearwardly against the biasing force of the tension coil springs (biasing members) 18 (see FIG. 8B). Then, as shown in FIG. 7B, the front ends 16c of the right and left side support sections 16 of the movable frame 10 are also moved rearwardly, so that the pad 30 can be smoothly deformed (flexurally deformed) rearwardly without being hindered by the front ends 16c of the side support sections 16. Thus, a back of the occupant receiving a rearward force during the rear collision is largely displaced rearwardly, for example, from the line M-1 in FIG. 7A to the line M-3 in FIG. 7B, while pressing and flattening the pad 30.

In this manner, the back of the occupant is displaced rearwardly in such a manner as to be largely sunk into the seat back, so that a head of the occupant is reliably stopped by the headrest 41 as shown in FIG. 12B, to effectively prevent neck damage to the occupant.

In addition, in the normal state, the present of the back-receiving section 11 of the movable frame 10 can provide enhanced rigid feel to a region of the seat back supporting the back of the occupant, and the presence of the right and left side support sections 16 can moderately restrain an upper body of the occupant so as not to be largely wobbled in the lateral direction.

In the above embodiment, the concave portion 30a is formed in the region of the inner surface of the pad 30 located around the front end 16c of each of the side support sections 16, to reduce the thickness of the pad 30. Thus, the region of the pad 30 around the front end 16c of the side support section 16 becomes more likely to be deformed, so that followability of the pad 30 to the rearward movement of the front end 16c of the side support section 16 is improved.

In the above embodiment, the rear stoppers 29 are provided in the base frame 7 to prevent the movable frame 10 from being moved a given distance or more rearwardly during a rear collision. Specifically, when the movable frame 10 is moved rearwardly from the normal position illustrated in FIG. 7A to the position illustrated in FIG. 7B, right and left ends (side support sections 16) of the movable frame 10 come into contact with the rear stoppers 29 to restrict the movable frame 10 from being moved any further. This makes it possible to prevent an occupant from being excessively displaced rearwardly so as to adequately ensure occupant safety.

If impact energy during a rear collision is considerably large, a back of the occupant is urged to be displaced rearwardly beyond a restriction position based on the rear stoppers 29. In this case, the back-receiving section 11 of the movable frame 10 is deformed in response to receiving a load from the occupant, to efficiently absorb the impact energy. In this manner, such impact energy is efficiently absorbed along with the deformation of the back-receiving section 11. Thus, even if a rear collision involving relatively large impact energy occurs, occupant safety can be adequately ensured.

In the above embodiment, the back-receiving section 11 of the movable frame 10 is formed in a frontwardly-convex arc shape. Thus, a distance between the back-receiving section 11 and a back of an occupant is reduced, so that a load from the occupant during a rear collision can be quickly transmitted to the movable frame 10. In addition, the load applied from the occupant can be concentrated to stabilize a behavior of the movable frame 10 during the rearward movement or deformation thereof.

In the above embodiment, the tension coil springs 18 are provided as biasing member to bias the movable frame 10 frontwardly with respect to the base frame 7. In this structure, a resistive force against the rearward movement of the movable frame 10 can be readily adjusted by changing a spring constant of each of the tension coil springs 18 and/or the number of the tension coil springs 18.

In the above embodiment, the front stopper comprised of the link 27, the support pin 28 and the stopper pin 26 is provided to restrict the movable frame 10 from being moved a given distance or more frontwardly (see FIG. 8A). This makes it possible to accurately set a frontmost position of the movable frame 10, and stably hold the movable frame 10 at the frontmost position.

In the above embodiment, the front portion of the link 27 is pivotally supported by the side support section 16 of the movable frame 10 through the support pin 28, and the stopper pin 26 provided in the side frame section 7b of the base frame 7 is inserted into the elongate hole 27a of the link 27. In this structure, the frontward movement of the movable frame 10 is restricted by causing the stopper pin 26 to come into contact with the rear end of the elongate hole 27a. Further, when the movable frame 10 is moved rearwardly during a rear collision, the stopper pin 26 is moved while being guided by the elongate hole 27a, so that the movable frame 10 is smoothly moved rearwardly.

In the above embodiment, the brake drum 20 is provided in the side frame section 7b of the base frame 7, and the stopper pin 26 is fixed to the pinion plate 25 of the brake drum 20. In this structure, when the input shaft 22 of the brake drum 20 is manually rotated, the output shaft 23 and the pinion plate 25 are rotated, and the stopper pin 26 is moved in the frontward-rearward direction accordingly. Thus, the link 27 is moved in the frontward-rearward direction according to the stopper pin 26, so that the frontward-rearward position of the movable frame 10 is adjusted.

In the above embodiment, the upper brackets 7d of the seat back frame 3 are pivotally supported by the lower brackets 2a of the cushion frame 2 through the reclining shaft 12, and the side support sections 16 (bearing portions 16a) of the movable frame 10 are also pivotally supported by the side frame sections 7b of the base frame 7 through the same reclining shaft 12. In this structure, the movable frame 10 can be rationally supported in a movable manner in a frontward-rearward direction by utilizing the existing reclining shaft 12.

In the above embodiment, the movable frame 10 is provided at a height position corresponding to a lumbar region of an occupant, so that the movable frame 10 additionally carries out a function of supporting the lumbar region of the occupant. Thus, the movable plate 10 provided in a frontward-rearward movable manner as measures against neck damage to an occupant can be additionally used as a lumbar support plate for supporting a lumbar region of the occupant, to facilitate reductions in cost and weight based on a reduction in the number of components.

Figure 11A:
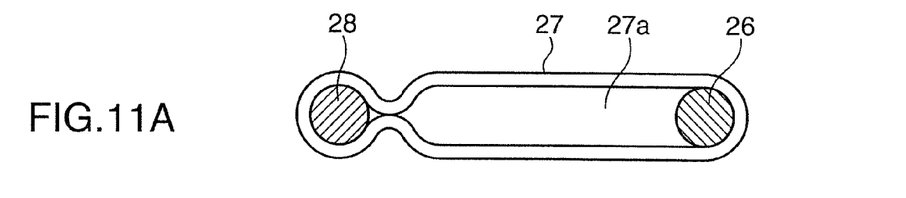
FIG. 11A and FIG. 11B are a side view of a link in a modified embodiment, and a side view of a link in another modified embodiment, respectively.
Figure 11B:
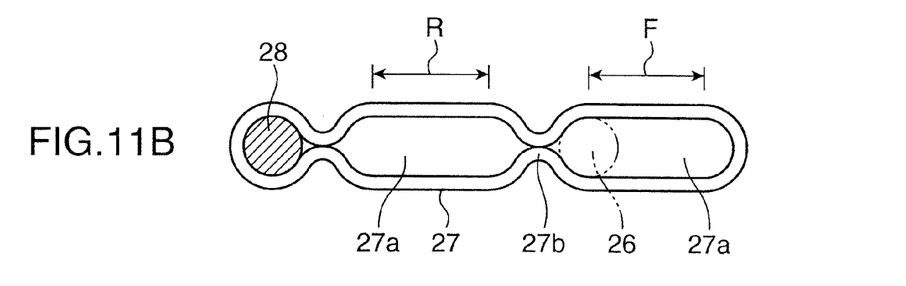

The link 27 as shown in the above embodiment as an example is formed by providing the elongate hole 27a in a plate. Alternatively, as shown in FIG. 11A, a link 27 having an elongate hole 27a may be formed by bending a plate or a rod consisting of an elastic body into a ring shape. In this case, as shown in FIG. 11B, a node portion 27b where a width of the elongate hole 27a is narrowed may be provided at a longitudinally intermediate position of the link 27 to divide the elongate hole 27a into a front movable range F and a rear movable range R on both sides of the node portion 27b.

In this structure, the front movable range F of the link 27 is defined as an adjustable range of the frontward-rearward position of the movable frame 10 in the normal state. Specifically, when the stopper pin 26 is in the front movable range F, the frontward-rearward position of the movable frame 10 can be adjusted in the range from a rear end of the elongate hole 27a and the node portion 27b. Particularly, when the movable frame 10 is additionally used as a lumbar support plate, the above structure may be utilized to make it possible to adequately set an adjustable range of an occupant's lumbar region support position (lumbar support position).

In the event of a rear collision, the movable frame 10 is further moved rearwardly due to a load input from an occupant, and the stopper pin 26 is moved across the node portion 27b to enter into the rear movable range R. Subsequently, when a load from the occupant is lowered, the movable frame 10 is urged to be returned frontwardly according to the biasing force of the tension coil springs 18. In this case, the stopper pin 26 is moved across the node portion 27b again, and thereby the frontward return movement of the movable frame 10 is decelerated, so that it becomes possible to prevent an excessive force from being applied to the occupant due to the return movement of the movable frame 10

In the above embodiment, the capability to adjust the frontward-rearward position of the movable frame 10 is achieved using the brake drum 20. Alternatively, a structure formed by omitting the function of adjusting the frontward-rearward position of the movable frame 10 (omitting the brake drum) may also be employed.

Figure 9A:
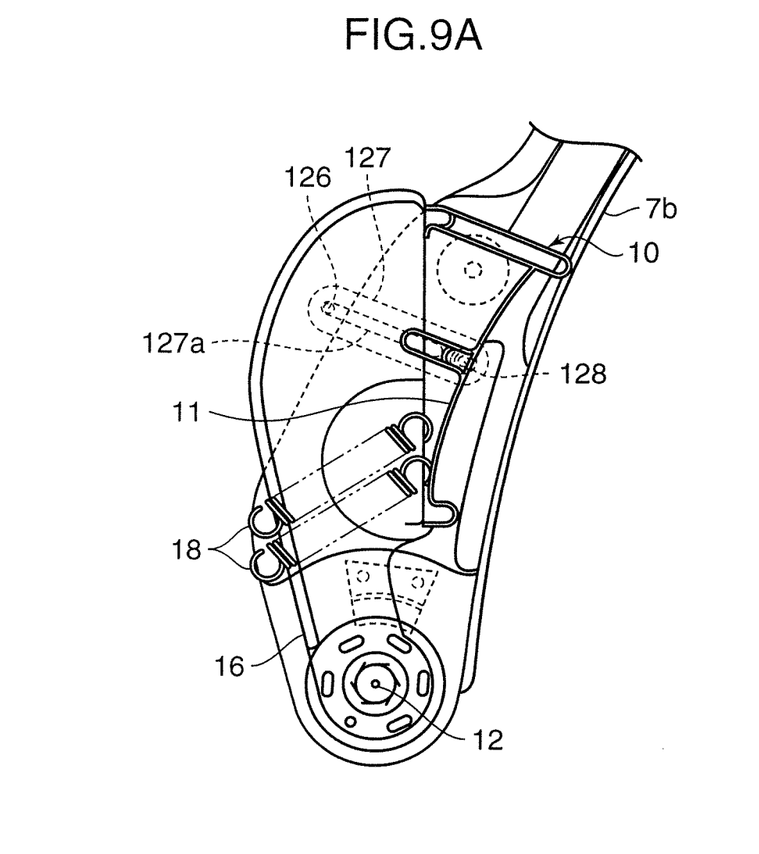
Figure 9B:
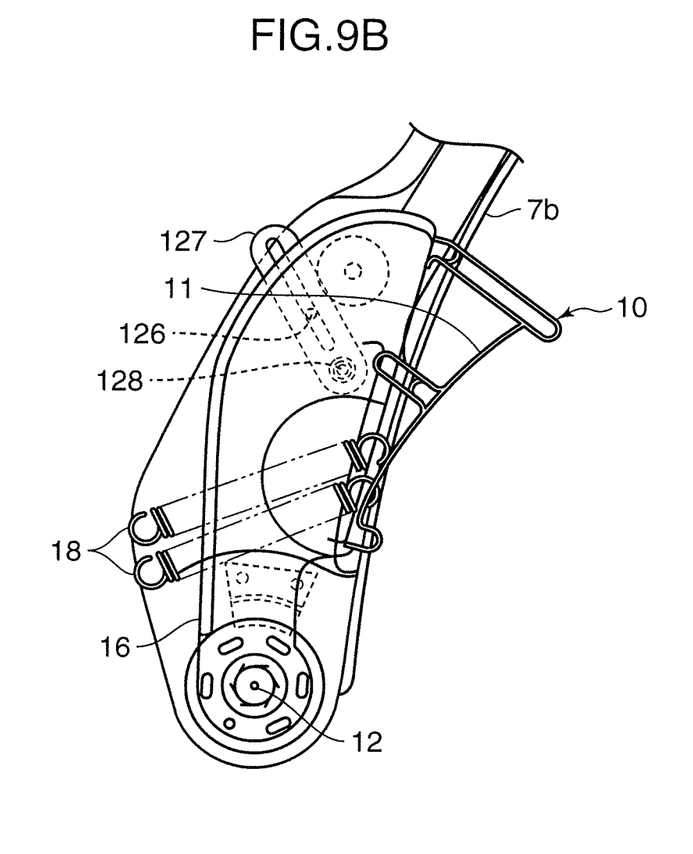

FIGS. 9A and 9B show a specific example of modification of the above embodiment, wherein the brake drum 20 is omitted. In the illustrated modified embodiment, a support pin 128 is attached to one of the side frame sections 7b, and a rear portion of a link 127 is pivotally supported by the side frame section 7b through the support pin 128. Further, a stopper pin 126 is attached to a corresponding one of the side support sections 16, and the stopper pin 126 is slidably inserted into an elongate hole 127a of the link 127.

In this structure, as shown in FIG. 9A, the frontward movement of the movable frame 10 is restricted by causing the stopper pin 126 to come into contact with a front end of the elongate hole 127a of the link 127. This makes it possible to accurately set a frontmost position of the movable frame 10, and stably hold the movable frame 10 at the frontmost position.

Further, as shown in FIG. 9B, when the movable frame 10 is moved rearwardly, the right and left ends (side support sections 16) of the movable frame 10 come into contact with the rear stoppers 29 to restrict the movable frame 10 from being moved any further, in the same manner as that in FIG. 7B. This makes it possible to prevent the movable frame 10 from being excessively moved rearwardly so as to ensure occupant safety.

In the modified embodiment illustrated in FIGS. 9A and 9B, the brake drum 20 can be omitted to facilitate a reduction in cost based on a reduction of the number of components. Further, in cases where both a type using the brake drum 20 and a type avoiding the use of the brake drum 20 are produced depending on needs, components for the two types, such as the links 127, 27 or the stopper pins 126, 26, can be shared. In view of this, a lower cost is achieved.

The front stopper may be formed without using the link 27 and the stopper pin 26. As a specific example, it can be contemplated that a member capable of coming into contact with one of the side support sections 16 to restrict the frontward movement of the movable frame 10 is integrally provided on a corresponding one of the side frame sections 7b of the base frame 7, in the same manner as the rear stopper 29 described above.

Figure 10A:
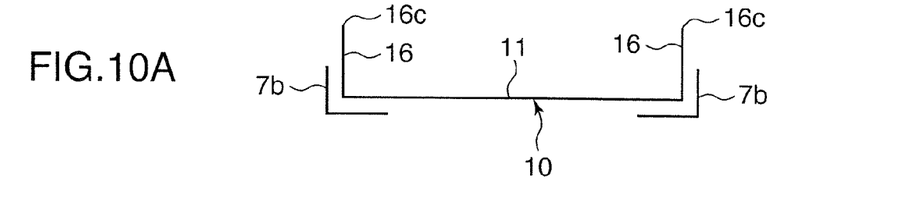
FIG. 10A and FIG. 10B are a schematic diagram showing a positional relationship between each of a pair of side frame sections of the base frame and a corresponding one of a pair of side support sections of the movable frame, in the above embodiment, and a schematic diagram showing the positional relationship in a modified embodiment, respectively.
Figure 10B:
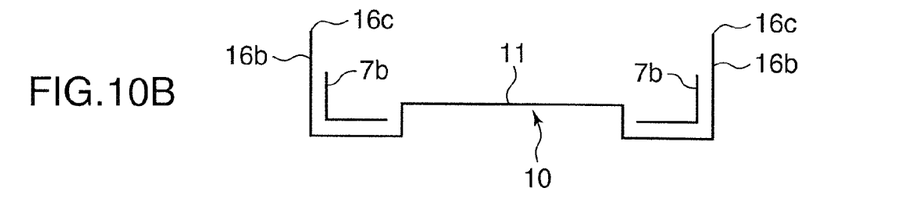

In the above embodiment, as shown in the schematic diagram of FIG. 10A, each of the right and left side support sections 16 of the movable frame 10 is disposed inside a corresponding one of the side frame sections 7b of the base frame 7, while allowing the front end 16c thereof to project forward from the corresponding side frame sections 7b. Alternatively, as shown in the schematic diagram of FIG. 10B, each of the right and left side support sections 16 may be disposed outside a corresponding one of the side frame sections 7*b* of the base frame 7, while allowing the front end 16*c* thereof to project forward from the corresponding side frame sections 7*b*.

Although the movable frame 10 in the above embodiment is additionally used as a lumbar support for supporting a lumbar region of an occupant, it is not essential to additionally use it as the lumbar support.

In the above embodiment, the movable plate 10 is formed by joining the side support sections 16 to respective ones of the laterally opposite edges of the back-receiving section 11. Alternatively, the back-receiving section 11 and the side support sections 16 may be integrally formed as one piece by bending a single sheet of plate through sheet metal working.

In the above embodiment, the movable frame 10 is pivotally supported by the base frame 7 through the reclining shaft 12. Alternatively, any other support structure capable of supporting the movable frame 10 with respect to the base frame 7 in a frontward-rearward movable manner may be employed.

In the above embodiment, a tension coil spring 18 is used as the biasing member. However, the biasing member is not limited thereto.

In the above embodiment, the front stopper is made up of a link 27 formed with an elongate hole 27*a*, a support pin 28 provided on one of the side support sections 16, and a stopper pin 26 inserted into the elongate hole 27*a*. However, the front stopper is not limited thereto.

Finally, features of the aforementioned vehicle seat and effects/advantages thereof will be reviewed.

The vehicle seat comprises a seat back including a pad and a seat back frame supporting the pad, and a headrest provided on a top of the seat back. The seat back frame includes a base frame; a movable frame supported in a movable manner in a frontward-rearward direction with respect to the base frame, and biasing member biasing the movable frame frontwardly and being adapted to permit a rearward movement of the movable frame when a load having a given value or more is input thereinto. The base frame has an upper frame section supporting the headrest, and a pair of side frame sections extending in an upward-downward direction in respective positions on laterally opposite sides of the upper frame section. The movable frame has a back-receiving section located between the pair of side frame sections, and a pair of side support sections provided on respective ones of laterally opposite sides of the back-receiving section to project forward from the side frame sections. Respective front ends of the pair of side support sections are disposed to stop a rear surface of the pad which receives a rearward load from a back of an occupant.

In the above vehicle seat, in the event of a rear collision with a vehicle, a load from an occupant is applied to the back-receiving section of the movable frame due to the reaction of the rear collision, and thereby the movable frame is moved rearwardly against a biasing force of the biasing member. Then, the front ends of the pair of right and left side support sections of the movable frame are also moved rearwardly, so that the pad can be smoothly deformed (flexurally deformed) rearwardly without being hindered by the front ends of the side support sections. This makes it possible to allow a head of the occupant to be reliably stopped by the headrest, so as to effectively prevent neck damage to the occupant.

Preferably, in the above vehicle seat, that the pad has a concave portion for reducing a thickness thereof, in a region around each of the front ends of the pair of side support sections.

Base on this feature, the region of the pad around the front end of the side support section becomes more likely to be deformed, so that followability of the pad to the rearward movement of the front end of the side support section is improved.

Preferably, the above vehicle seat further comprises a rear stopper adapted to restrain the movable frame from being moved a given distance or more rearwardly.

This feature makes it possible to prevent an occupant from being excessively displaced rearwardly so as to adequately ensure occupant safety. In addition, even if impact energy during a rear collision is considerably large, the back-receiving section of the movable frame is deformed in response to receiving a load from the occupant, to efficiently absorb the impact energy.

Preferably, in the above vehicle seat, the back-receiving section of the movable frame is formed in a frontwardly-convex arc shape in side view.

Based on this feature, a distance between the back-receiving section and a back of an occupant is reduced, so that a load from the occupant during a rear collision can be quickly transmitted to the movable frame. In addition, the load from the occupant can be concentrated to stabilize a behavior of the movable frame during the rearward movement or deformation thereof.

Preferably, in the above vehicle seat, the biasing member comprises a tension coil spring having one end engaged with one of the side frame sections of the base frame and the other end engaged with a lateral portion of the movable frame.

Based on this feature, a resistive force against the rearward movement of the movable frame can be readily adjusted by changing a spring constant of the tension coil spring and/or the number of the tension coil springs.

Preferably, the above vehicle seat further comprises a front stopper adapted to restrain the movable frame from being moved a given distance or more frontwardly.

This feature makes it possible to accurately set a frontmost position of the movable frame, and stably hold the movable frame at the frontmost position.

Preferably, in the above vehicle seat, the front stopper includes: a link formed with an elongate hole; a support pin for pivotally supporting a front portion of the link to one of the side support sections of the movable frame; and a stopper pin provided on a corresponding one of the side frame sections of the base frame and slidably inserted in the elongate hole of the link.

Based on this feature, the frontward movement of the movable frame is restricted by causing the stopper pin to come into contact with a rear end of the elongate hole of the link. Further, when the movable frame is moved rearwardly during a rear collision, the stopper pin is moved while being guided by the elongate hole, so that the movable frame is smoothly moved rearwardly.

Preferably, the above vehicle seat further comprises a brake drum provided in the corresponding side frame section of the base frame, wherein the brake drum includes: an input shaft; an output shaft adapted to be rotated according to a manual rotating operation of the input shaft; and a pinion plate adapted to be rotated integrally with the output shaft, and wherein the stopper pin is fixed to the pinion plate, so that the stopper pin is moved in the frontward-rearward direction according to the manual rotating operation of the input shaft.

Based on this feature, when the input shaft of the brake drum is manually rotated, the output shaft and the pinion plate are rotated, and the stopper pin is moved in the frontward-rearward direction accordingly. Thus, the link is moved in the frontward-rearward direction according to the stopper pin, so that the frontward-rearward position of the movable frame is adjusted.

More preferably, in the vehicle seat where the frontward-rearward position of the movable frame can be adjusted based on a manual operation of the brake drum, the link is formed from an elastic body to have a node portion between a front movable range and a rear movable range of the stopper pin.

Based on this feature, the front movable range is defined as an adjustable range of the frontward-rearward position of the movable frame in a normal state. Specifically, when the stopper pin is in the front movable range, the frontward-rearward position of the movable frame can be adjusted in the range from a rear end of the elongate hole and the node portion. In the event of a rear collision, after the stopper pin is moved across the node portion to enter into the rear movable range, the movable frame is urged to be returned frontwardly according to the biasing force of the biasing member. In this case, the stopper pin is moved across the node portion again, and thereby the frontward return movement of the movable frame is decelerated, which makes it possible to prevent an excessive force from being applied to the occupant due to the return movement of the movable frame.

As an alternative structure of the front stopper, the front stopper may include: a link formed with an elongate hole; a support pin for pivotally supporting a rear portion of the link to one of the side frame sections of the base frame; and a stopper pin provided on a corresponding one of the side support sections of the movable frame and slidably inserted in the elongate hole of the link.

Based on this feature, the frontward movement of the movable frame is restricted by causing the stopper pin to come into contact with a front end of the elongate hole of the link. Further, when the movable frame is moved rearwardly during a rear collision, the stopper pin is moved while being guided by the elongate hole, so that the movable frame is smoothly moved rearwardly.

Preferably, the above vehicle seat further comprises a reclining shaft for pivotally supporting the seat back frame with respect to a cushion frame of a seat cushion in a swingable manner in the frontward-rearward direction, wherein a lower portion of each of the side support sections of the movable frame is pivotally supported with respect to a corresponding one of the side frame sections of the base frame through the reclining shaft.

Based on this feature, the movable frame can be rationally supported in a frontward-rearward movable manner by utilizing the existing reclining shaft.

Preferably, in the above vehicle seat, the movable frame is additionally used as a lumbar support plate for supporting lumbar region of an occupant.

In this case, the movable plate provided in a frontward-rearward movable manner as measures against neck damage to an occupant can be additionally used as a lumbar support plate for supporting a lumbar region of the occupant, to facilitate reductions in cost and weight based on a reduction in the number of components.

This application is based on Japanese patent application serial no. 2009-204738, filed in Japan Patent Office on Sep. 4, 2009, Japanese patent application serial no. 2009-255789, filed in Japan Patent Office on Nov. 9, 2009 and Japanese patent application serial no. 2010-153819, filed in Japan Patent Office on Jul. 6, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle seat comprising:
a seat back including a pad and a seat back frame supporting the pad, and
a headrest provided on a top of the seat back, wherein:
the seat back frame includes: a base frame; a movable frame supported in a movable manner in a frontward-rearward direction with respect to the base frame; and biasing member biasing the movable frame frontward and being adapted to permit a rearward movement of the movable frame when a load having a given value or more is input therein;
the base frame has an upper frame section supporting the headrest, and a pair of side frame sections extending in an upward-downward direction in respective positions on laterally opposite sides of the upper frame section;
the movable frame has a back-receiving section located between the pair of side frame sections, and a pair of side support sections provided on respective ones of laterally opposite sides of the back-receiving section to project forward with respect to both of the back-receiving section and the side frame sections;
respective front ends of the pair of side support sections are disposed to stop a rear surface of the pad which receives a rearward load from a back of an occupant and are disposed and configured to move rearward with the rearward movement of the movable frame; and
the pad has an inner surface spaced apart from the projecting front end of each of the side support sections toward an outer side in a widthwise direction of the vehicle seat, with a concave portion for reducing a thickness of the pad being formed in a region of the inner surface of the pad to improve flowability of the pad with the rearward movement of the front end of each of the side support sections.

2. The vehicle seat as defined in claim 1, further comprising a rear stopper adapted to restrain the movable frame from being moved a given distance or more rearwardly.

3. The vehicle seat as defined in claim 1, wherein the back-receiving section of the movable frame is formed in a frontwardly-convex arc shape in side view.

4. The vehicle seat as defined in claim 1, wherein the biasing member comprises a tension coil spring having one end engaged with one of the side frame sections of the base frame and the other end engaged with a lateral portion of the movable frame.

5. The vehicle seat as defined in claim 1, further comprising a front stopper adapted to restrain the movable frame from being moved a given distance or more frontwardly.

6. The vehicle seat as defined in claim 5, wherein the front stopper includes: a link formed with an elongate hole; a support pin for pivotally supporting a front portion of the link to one of the side support sections of the movable frame; and a stopper pin provided on a corresponding one of the side frame sections of the base frame and slidably inserted in the elongate hole of the link.

7. The vehicle seat as defined in claim 6, further comprising a brake drum provided in the corresponding side frame section of the base frame, wherein:
the brake drum includes: an input shaft; an output shaft adapted to be rotated according to a manual rotating operation of the input shaft; and a pinion plate adapted to be rotated integrally with the output shaft; and the stopper pin is fixed to the pinion plate, so that the stopper pin is moved in the frontward-rearward direction according to the manual rotating operation of the input shaft.

8. The vehicle seat as defined in claim 7, wherein:
the link is formed from an elastic body to have a node portion between a front movable range and a rear movable range of the stopper pin; and
when a rearward load having a given value is input to the movable frame, the stopper pin is moved across the node portion to enter into the rear movable range, while opening the node portion and returning the node portion to the original state.

9. The vehicle seat as defined in claim 5, wherein the front stopper includes: a link formed with an elongate hole; a support pin for pivotally supporting a rear portion of the link to one of the side frame sections of the base frame; and a stopper pin provided on a corresponding one of the side support sections of the movable frame and slidably inserted in the elongate hole of the link.

10. The vehicle seat as defined in claim 1, further comprising a reclining shaft for pivotally supporting the seat back frame with respect to a cushion frame of a seat cushion in a swingable manner in the frontward-rearward direction, wherein:
a lower portion of each of the side support sections of the movable frame is pivotally supported with respect to a corresponding one of the side frame sections of the base frame through the reclining shaft.

11. The vehicle seat as defined in claim 1, wherein the movable frame is additionally used as a lumbar support plate for supporting lumbar region of an occupant.

* * * * *